SPINDLE ADAPTER

Filed Oct. 24, 1962

2 Sheets-Sheet 1

INVENTOR:
Martin C. Reed
BY Hofgren, Brady, Wegner, Allen & Stellman
Att'ys

June 29, 1965 M. C. REED 3,191,943

SPINDLE ADAPTER

Filed Oct. 24, 1962 2 Sheets-Sheet 2

United States Patent Office 3,191,943

Patented June 29, 1965

3,191,943

SPINDLE ADAPTER

Martin C. Reed, Roselle, Ill., assignor to Warwick Electronics Inc., a corporation of Delaware Filed Oct. 24, 1962, Ser. No. 232,805
5 Claims. (Cl. 274—10)

This invention relates to spindle adapters and more particularly to a spindle adapter for handling large hole records.

In certain types of record changers currently available a small hole record spindle is associated with the turntable of a record changer for handling small hole records and has record ejector mechanism. When it is desired to play commercially available records having a relatively large hole in the center thereof it is necessary to utilize an adapter. If automatic changing of these records is to occur, the adapter mechanism must have means for supporting a stack of records and selectively feeding the lowermost record of the stack from the stack so that it may move onto the turntable. In the past, the mechanism associated with the adapter has embodied a plurality of movable interconnected parts forming record supporting shelves and record separating blades which constitute a complex mechanical structure which is costly in manufacture and assembly.

An object of this invention is to provide a new and improved spindle adapter having a minimum number of parts for automatically changing large hole records.

Another object of this invention is to provide a spindle adapter constructed to have an integral shelf for supporting a stack of records and a simple ejector member movable outwardly across the shelf to shift the lowermost record of a stack off the shelf for movement onto the turntable with said member being actuable by the record ejector mechanism of the small hole record spindle on which the adapter is fitted.

Still another object of the invention is to provide a spindle adapter as defined in the preceding paragraph in which said member is movably guided in the spindle adapter with spring means engageable therewith to urge the member to a withdrawn rest position, means on said member engageable by an ejector lever of the small hole record spindle for moving the member against the spring to eject a record and means on the upper part of the spindle adapter for guiding successive records downwardly along the spindle adapter onto the shelf with said means being movable to an out of the way position facilitating withdrawal of a record or records from the turntable and off the adapter.

Other objects and advantages will become readily apparent from the following detailed description taken in connection with the accompanying drawings, in which.

Figure 1:
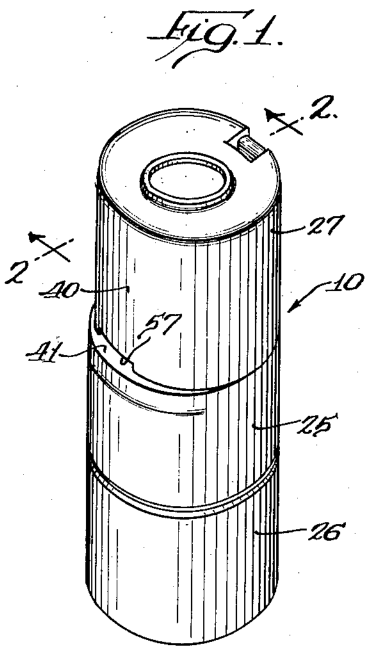
FIG. 1 is a perspective elevational view of one embodiment of the adapter.
Figure 3:
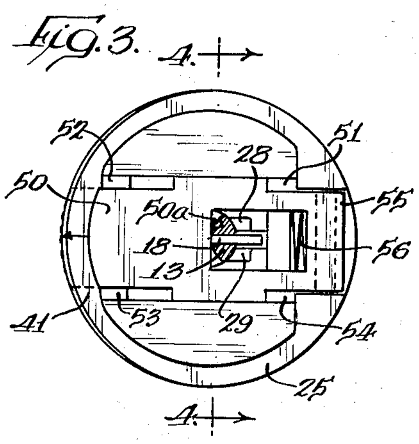
FIG. 3 is a plan section taken generally along the line 3—3 of FIG. 2.
Figure 4:
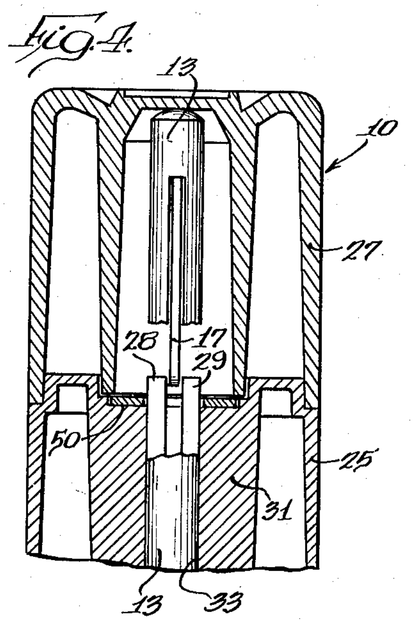
FIG. 4 is a vertical fragmentary section taken generally along the line 4—4 of FIG. 3.

While an illustrative embodiment of the invention together with a modified embodiment are shown in the drawings and will be described in detail herein, the invention is susceptible of embodiment in many different forms, and it should be understood that the present disclosure is to be considered as exemplifications of the principles of the invention and is not intended to limit the invention to the embodiments illustrated. The scope of the invention will be pointed out in the appended claims.

Figure 2:
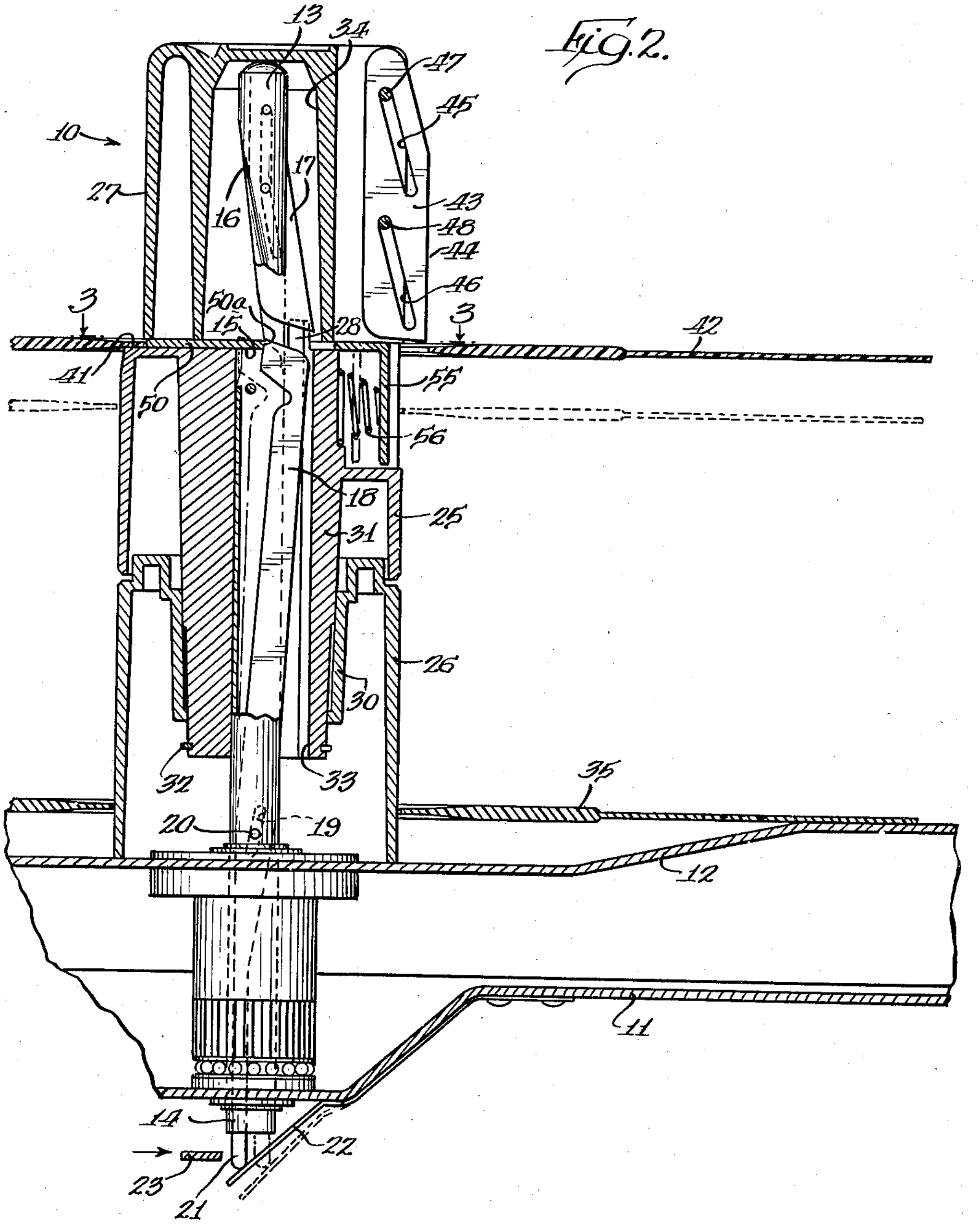
FIG. 2 is an enlarged vertical section of the adapter taken generally along the line 2—2 of FIG. 1 and showing the adapter in assembled relation with the record changer having a small hole record spindle with the changer being shown in a fragmentary central vertical section.

A preferred embodiment of spindle adapter for handling large hole records is indicated generally at 10 in FIG. 1 and is shown in association with a turntable in FIG. 2. First referring to FIG. 2, the record changer embodies a motorboard 11 which rotatably mounts a turntable 12. Extending upwardly centrally of the turntable 12 and in fixed relation thereto is a small hole record spindle 13 having a lower end 14 extending beneath the motorboard 11. As is conventionally known in the art, the small hole record spindle 13 has a record supporting shelf 15 with a cutback section 16 thereabove permitting records to move down onto the shelf 15 as they are guided by a slider member 17 having a downward and outward slope and which terminates above the shelf 15 at a distance at least equal to the thickness of a record.

The small hole record spindle 13 has a record ejector lever 18 pivotally mounted therein by means of an elongated slot 19 formed in the lever receiving a pin 20 secured to the spindle. A lower end 21 of the ejector lever is engaged by a spring 22 secured to the motorboard and the ejector lever 18 is thereby urged upwardly to an upper position with the lever also being generally in a clockwise position of rotation as shown in full line in FIG. 2. The ejector lever 18 can be moved in a counterclockwise direction as viewed in FIG. 2 to the broken line position by an actuating member 23 operated in timed relation by the conventional mechanism of the record changer. When handling small hole records this movement of the ejector lever results in shifting the lowermost record off the shelf 15 so that the record can move down along the spindle 13 into operative relation with the turntable 12. With the spindle adapter 10 mounted on the small hole record spindle 13 the movement of the ejector lever 18 is utilized to cause the changing of a large hole record supported on the adapter 10.

The adapter 10 is formed in three parts with a central part 25, a lower part 26 and an upper part 27. The central part 25 and upper part 27 are suitably secured together as by adhesive or screws and are held against rotation relative to the small spindle 13 by interengagement of the slider member 17 of the spindle 13 with a pair of lugs 28 and 29 formed at the upper end of the central part 25 of the adapter. The lower part 26 of the spindle adapter 10 is rotatably mounted relative to the central part 25 by having a sleeve portion 30 rotatable on an inner tubular section 31 of the adapter central part 25 and with the adapter parts 25 and 26 being held in assembled relation by a washer 32. The tubular section 31 of the adapter central part 25 is internally hollow as indicated at 33 as is the upper part 27 as indicated at 34 to define a central aperture for receiving the small hole record spindle 13. With this construction, the spindle adapter 10 can be mounted on the small hole record spindle 13 with the lower part 26 of the adapter being free for rotation with the turntable 12 due to engagement therewith as well as with a record 35 supported on the turntable.

The upper part 27 of the spindle adapter is concentric with the central part 25 at one side thereof as seen in FIG. 1 with an area 40 of the upper part sloping downwardly and inwardly to permit exposure of a shelf 41 at the upper face of the central part which extends horizontally about a portion of the periphery of the adapter. This shelf 41 supports a record 42 as will be seen in FIG. 2 and a record is caused to move downwardly along the upper part 27 of the spindle adapter by a slider member 43 at the side of the adapter opposite from the shelf 41. The slider member 43 has a surface 44 dimensioned to cause a record to be offset toward the right as viewed in FIG. 2 as it descends toward the shelf 41. This slider member has a pair of elongated slots 45 and 46 mounting the slider member on adapter mounted pins 47 and 48, respectively, for upward and inward movement to freely permit removal of a stack of records from the turntable without removal of the adapter.

Means are provided for simply ejecting a record 42 off the shelf 41 by actuation of the small hole ejector lever 18. This means comprises a plate member 50 mounted at the top of the adapter central part 25 and resting on the upper face thereof with side guiding of the member being accomplished by engagement at the sides of said member with tabs 51, 52, 53 and 54 extending upwardly from the upper face of the adapter central part 25. The member 50 has a down turned flange 55 with a spring 56 located between the flange and the section 31 of the adapter central part 25 urging the member 50 to a retracted rest position. The member 50 is at a level and has an opening with an edge 50*a* to be engaged by the small hole record ejector lever 18 as will be seen in FIG. 2 so that as this lever moves from its full line to broken line position the member 50 is caused to move outwardly over the shelf 41 through an opening 57 at the lower edge of the upper adapter part 27 against the action of the spring 56.

When the actuating member 23 for the small hole record ejector lever 18 is withdrawn, the ejector lever is free to move to its full line position and the ejector member 50 of the adapter is retracted by action of the spring 56.

It will be seen from the foregoing that only a single ejector member is required for the spindle adapter to cause release of a record from the adapter for movement to the turntable which results in a substantially less number of moving parts than adapters that are currently available.

Figure 5:
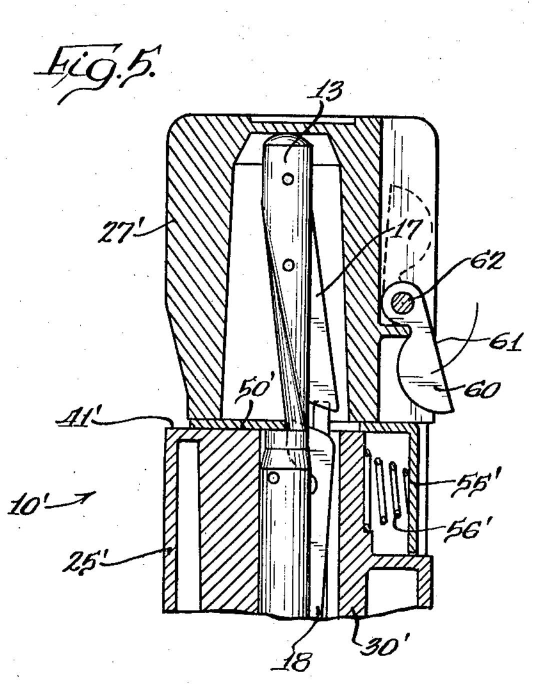
FIG. 5 is a fragmentary vertical section taken centrally through an alternate embodiment of the adapter shown in association with a small hole record spindle.

An alternate embodiment of adapter is shown in FIG. 5 in which parts corresponding to those shown in the embodiment of FIGS. 1 through 4 are given the same reference numeral with a prime affixed thereto. In the embodiment of FIG. 5, instead of the slider member 43, a pivoted member 60 has a full line position with an outer sloped face 61 for guiding large hole records down onto the shelf 41' and the member is pivoted to the upper part 27' of the adapter by a pin 62. With the member 60 pivoted it can move to the broken line position in a counterclockwise direction of movement so that the member is located within the periphery of the adapter fo facilitate removal of a record or stack of records from the turntable 12 without removal of the adapter.

In both embodiments, a pressure arm is conventionally used with the small hole record spindle 13 can be used to steady a record on the shelf 41.

I claim:

1. A spindle adapter for supporting a stack of large hole records relative to a turntable comprising: a body having a central aperture for receiving a small hole record spindle, said body having a central part and an upper part with said upper part having a portion of its periphery sloping inwardly and downwardly to define a shelf at one side of the upper face of said central part, a plate slidably mounted on said central part and movable from an inner rest position to an outward exposed position over said shelf, a downturned flange on said plate, spring means between said central part and said flange urging the plate to said rest position, an opening in said plate with an edge thereof adjacent said aperture for engagement by record ejecting mechanism of said small hole record spindle to move said plate outwardly against the action of said spring means, and movable means on said upper part for guiding a record onto said shelf.

2. A spindle adapter as defined in claim 1 in which said record guiding means comprises a pivoted member with a sloped outer face.

3. A spindle adapter for supporting a stack of large hole records relative to a turntable comprising: a body having a central part and an upper part with said upper part having a portion of its periphery sloping inwardly and downwardly to define a shelf at one side of the upper face of said central part, a plate slidably mounted on said central part and movable from an inner rest position to an outward exposed position over said shelf to move a record from said shelf, a downturned flange on said plate, and spring means between said central part and said flange urging the plate to said rest position.

4. A spindle adapter for supporting a stack of large hole records relative to a turntable by mounting on a small hole record spindle having a record ejector mounted therein and operable at the level of a shoulder on said spindle comprising: a body having a central aperture for receiving a small hole record spindle, said body having a columnar central part and an upper part with a record supporting shelf therebetween, said shelf being located at one side of the adapter body, said upper part of the adapter body being set back whereby an exposed surface of said columnar central part defines said shelf, a relatively flat plate mounted within said adapter body and movable in a plane at a level immediately above said shelf between an inner rest position and an outer exposed position to engage within the center hole of a large hole record and shift the record off said shelf, spring means operatively connected to said plate and adapter body for urging the plate to said inner rest position, means defining an opening in said plate through which said spindle may pass with an edge of said opening lying adjacent said spindle record ejector when the plate is at said inner rest position for direct engagement by said record ejector whereby movement of the record ejector moves said plate outwardly of the adapter against the action of the spring means, a member mounted on the upper part of the adapter body at the side opposite said shelf for guiding large hole records onto the shelf, said member terminating at a level a record thickness above said shelf whereby a record can move therebeneath during ejection from the shelf, and means mounting the member for movement into the adapter body in response to an upward force as records are removed from the adapter but preventing such inward movement in response to lateral forces as exerted by records during the ejection of a record from said shelf.

5. A spindle adapter as defined in claim 4 in which said spring means is a coiled compression spring.

References Cited by the Examiner

UNITED STATES PATENTS

| | | | |
|---|---|---|---|
| 2,761,687 | 9/56 | Da Costa | 274—10 |
| 2,884,255 | 4/59 | Wennerbo | 274—10 |

NORTON ANSHER, *Primary Examiner.*